United States Patent
Hahn

(10) Patent No.: US 8,166,067 B2
(45) Date of Patent: Apr. 24, 2012

(54) METHOD AND APPARATUS FOR PROVIDING ACCESS TO FILES BASED ON USER IDENTITY

(75) Inventor: Judah Gamliel Hahn, Ofra (IL)

(73) Assignee: Sandisk IL Ltd., Kfar Saba (IL)

( * ) Notice: Subject to any disclaimer, the term of this patent is extended or adjusted under 35 U.S.C. 154(b) by 350 days.

(21) Appl. No.: 12/344,407

(22) Filed: Dec. 26, 2008

(65) Prior Publication Data

US 2010/0169394 A1  Jul. 1, 2010

(51) Int. Cl.
G06F 7/00 (2006.01)
G06F 17/30 (2006.01)

(52) U.S. Cl. ........ 707/781; 707/783; 707/784; 707/785; 707/828; 713/155; 713/161; 726/2; 726/27; 715/719

(58) Field of Classification Search .......... 707/781, 707/784, 785, 783, 828, 763; 715/741, 743, 715/719; 713/182, 161, 155; 726/2, 4, 17, 726/21, 27, 28
See application file for complete search history.

(56) References Cited

U.S. PATENT DOCUMENTS

| | | | | |
|---|---|---|---|---|
| 5,931,947 | A  * | 8/1999 | Burns et al. | 726/4 |
| 6,377,958 | B1 * | 4/2002 | Orcutt | 707/690 |
| 6,405,315 | B1 * | 6/2002 | Burns et al. | 713/190 |
| 6,438,705 | B1 | 8/2002 | Chao et al. | |
| 6,925,545 | B2 | 8/2005 | March et al. | |
| 7,073,010 | B2 | 7/2006 | Chen et al. | |
| 7,184,264 | B2 | 2/2007 | Le | |
| 7,210,043 | B2 | 4/2007 | Miyazaki et al. | |
| 7,272,606 | B2 | 9/2007 | Borthakur et al. | |
| 7,272,613 | B2 | 9/2007 | Sim et al. | |
| 7,512,979 | B1 | 3/2009 | Koike et al. | |
| 7,778,972 | B1 * | 8/2010 | Cormie et al. | 707/626 |
| 7,870,282 | B2 | 1/2011 | Jonsson et al. | |
| 7,975,270 | B2 | 7/2011 | Ferri et al. | |
| 8,015,584 | B2 | 9/2011 | Breen et al. | |

(Continued)

FOREIGN PATENT DOCUMENTS

EP  1536427 A1  6/2005

(Continued)

OTHER PUBLICATIONS

Jansen et al.—"Smart cards and Mobile Handheld Devices: An Overview and Implementation"—NIST (NSTIR 7206—Jul. 2005 (pp. 1-52).*

(Continued)

*Primary Examiner* — Phong Nguyen
*Assistant Examiner* — Anh Ly
(74) *Attorney, Agent, or Firm* — Toler Law Group, PC

(57) ABSTRACT

A storage device provides a file system to a host based on the access rights of a user determined during authentication. If the authentication does not succeed, the storage device provides to the user a file system restricted to files authorized by public access rights. If the authentication does succeed, and the user is a device owner, the storage device provides to the user the native file system. If the authentication succeeds, and the user is not a device owner, the storage device provides a file system that is restricted to files that the given user is authorized to access. Due to the internal nature of the mechanism for safeguarding files, this security measure cannot be circumvented by simply connecting the storage device to another host that does not respect the permission rules of the file system.

21 Claims, 5 Drawing Sheets

U.S. PATENT DOCUMENTS

| | | | |
|---|---|---|---|
| 2003/0180032 A1 | 9/2003 | Barde et al. | |
| 2004/0133650 A1 | 7/2004 | Miloushev et al. | |
| 2004/0133797 A1* | 7/2004 | Arnold | 713/182 |
| 2004/0252967 A1 | 12/2004 | Sheu et al. | |
| 2005/0005044 A1 | 1/2005 | Liu et al. | |
| 2005/0033721 A1 | 2/2005 | Cromer et al. | |
| 2006/0064476 A1 | 3/2006 | Decasper et al. | |
| 2006/0101259 A1* | 5/2006 | Chen | 713/2 |
| 2006/0107317 A1 | 5/2006 | Moran et al. | |
| 2006/0161754 A1 | 7/2006 | Dewey et al. | |
| 2007/0027873 A1 | 2/2007 | Factor et al. | |
| 2007/0050620 A1* | 3/2007 | Pham et al. | 713/165 |
| 2007/0073747 A1 | 3/2007 | Jung et al. | |
| 2007/0156842 A1* | 7/2007 | Vermeulen et al. | 709/217 |
| 2007/0159528 A1 | 7/2007 | Kikuchi et al. | |
| 2007/0233957 A1* | 10/2007 | Lev-Ran et al. | 711/118 |
| 2007/0247551 A1 | 10/2007 | Raines | |
| 2007/0250193 A1 | 10/2007 | Raines et al. | |
| 2007/0283094 A1* | 12/2007 | Narayanaswami et al. | 711/115 |
| 2008/0005531 A1* | 1/2008 | Praca | 711/209 |
| 2008/0034440 A1* | 2/2008 | Holtzman et al. | 726/27 |
| 2008/0059743 A1 | 3/2008 | Bychkov et al. | |
| 2008/0098023 A1 | 4/2008 | Araki et al. | |
| 2008/0154921 A1* | 6/2008 | Bauchot et al. | 707/100 |
| 2008/0163339 A1* | 7/2008 | Janakiraman et al. | 726/2 |
| 2008/0215744 A1 | 9/2008 | Shenfield | |
| 2008/0297656 A1 | 12/2008 | Saito | |
| 2009/0300710 A1* | 12/2009 | Chai et al. | 726/1 |
| 2010/0017546 A1 | 1/2010 | Poo et al. | |
| 2010/0122332 A1* | 5/2010 | Kamei et al. | 726/21 |
| 2010/0183277 A1 | 7/2010 | Okada et al. | |

FOREIGN PATENT DOCUMENTS

| | | |
|---|---|---|
| EP | 1586988 A2 | 10/2005 |
| EP | 1650665 A1 | 4/2006 |
| EP | 1998270 A1 | 12/2008 |
| WO | 2007099012 A1 | 9/2007 |

OTHER PUBLICATIONS

Meter et al.—"Derived Virtual Devices: A Secure Distributed File System Mechanism"—NASA Conference Publication, 1996 Citeseer (pp. 1-20).*

International Search Report and Written Opinion of International Application No. PCT/US2009/063260, dated Feb. 11, 2010, 15 pages.

"Ext2 Installable File System for Windows", www.fs-driver.org, printed Dec. 23, 2008, 6 pages.

Altaparmakov, Anton et al. "SfR Fresh"—The SfR Freeware/Shareware Archive, www.sfr-fresh.com, printed Dec. 23, 2008, copyright 2000-2005, 65 pages.

Rich, Donald. "Authentication in Transient Storage Device Attachments," IEEE Computer Society, vol. 40, No. 4, dated Apr. 2007, pp. 102-104.

International Search Report and Written Opinion received from the International Searthing Authority (EPO) for International Application No. PCT/US2009/062602, dated Jan. 27, 2010, 12 pages.

International Searth Report and Written Opinion for International Application No. PCT/US2009/063269 received from the International Searching Authority (EPO), dated Jan. 17, 2010, 14 pages.

International Search Report and Written Opinion for International Application No. PCT/US2009/062530 received from the International Searching Authority (EPO), dated Feb. 3, 2010, 13 pages.

Requirement for Restriction/Electrion for U.S. Appl. No. 12/344,373 received from the United States Patent and Trademark Office (USPTO), dated Aug. 22, 2011, 6 pages.

Requirement for Restriction/Electrion for U.S. Appl. No. 12/344,389 received from the United States Patent and Trademark Office (USPTO), dated Jan. 6, 2011, 5 pages.

Non-Final Office Action for U.S. Appl. No. 12/344,389 received from the United States Patent and Trademark Office (USPTO), dated Feb. 8, 2011, 8 pages.

Final Office Action for U.S. Appl. No. 12/344,389 received from the United States Patent and Tradmark Office (USPTO), dated Jul. 19, 2011, 11 pages.

Non-Final Office Action for U.S. Appl. No. 12/344,401 received from the United States Patent and Trademark Office (USPTO), dated Jun. 20, 2011.

Non-Final Action for U.S. Appl. No. 12/344,373 received from the United States Patent and Trademark Office (USPTO), dated Oct. 7, 2011, 16 pages.

Non-Final Office Action for U.S. Appl. No. 12/344,389 received from the United States Patent and Trademark Office (USPTO), dated Dec. 16, 2011, 9 pages.

Final Office Action for U.S. Appl. No. 12/344,401 received from the United States Patent and Trademark Office (USPTO), dated Dec. 1, 2011, 12 pages.

* cited by examiner

METHOD AND APPARATUS FOR PROVIDING ACCESS TO FILES BASED ON USER IDENTITY

RELATED APPLICATIONS

This patent application is related to and incorporates by reference the patent applications entitled "DEVICE AND METHOD FOR FILTERING A FILE SYSTEM" (application Ser. No. 12/344,389); "A STORAGE DEVICE MANAGING PLAYABLE CONTENT" (application Ser. No 12/344,401); and "A STORAGE DEVICE PRESENTING TO HOSTS ONLY FILES COMPATIBLE WITH A DEFINED HOST CAPABILITY" (application Ser. No. 12/344,373) in that each share a common inventor (Judah Gamliel Hahn) and were all filed on the same day.

BACKGROUND

A device owner of a storage device has full rights to the contents therein for reading and writing. Often, the device owner wants to grant or deny access rights to other users and/or groups of individuals. File systems, such as the New Technology File System (NTFS) of Windows and some of the Linux file systems, permit the device owner to control access to files by assigning permissions for files.

By using file system technology, the device owner may safeguard files in both internal system storage and in external, portable storage such as USB flash drives (UFDs). However, this technology for safeguarding files may be circumvented in a portable storage device by simply connecting the portable storage device to a host that does not respect the permission rules of the file system. For example, the Linux NTFS driver ignores permission rules. Also, some third party drivers, such as the open-source ext2ifs that allow Windows to access ext2 partitions, do not enforce Linux permission rules. (The term "ext2" stands for "second extended file system," and the term "ext2ifs" references an installable file system (IFS) driver written by Stephan Schreiber, which is a driver implemented for some versions of the Microsoft Windows operating system.) Even connecting the portable storage device to a host running a different Windows domain will allow a local administrator to act as a device owner and consequently to override security measures.

Microsoft developed the Encrypting File System (EFS), which transparently encrypts the data within an NTFS and stores the keys within an Active Directory schema. Such approach ensures that if permissions are circumvented, the data within the files remains inaccessible. However, while this works well when integrated into Windows, EFS does not work in an independent environment and requires a central authentication mechanism in order to retrieve the keys.

The encryption technique Pretty Good Privacy (PGP) utilizes a transparent file encryption engine that uses shared key-rings. This technique provides a flexible software-based framework for maintenance and enforcement of permissions. However, this permission system is independent of the native operating system user/group permission set and requires additional management and client software, which must be installed on the host to access the data.

Hence, there exists a need for a way to safeguard files from unauthorized access, which works in an independent environment, does not require a central authentication mechanism to retrieve keys, and does not require additional management and client software installed on a host.

SUMMARY

In view of the foregoing, exemplary embodiments of the invention as described herein are designed for safeguarding files from unauthorized access and modification. However, the principles described may be implemented in alternative embodiments.

In accordance with one example embodiment, a method of providing a file system in a storage device includes: commencing authentication of a user to at least a portion of a storage device; if the authentication does not succeed, providing to the user a second file system, the contents of the second file system being restricted to files authorized by public access rights; and, if the authentication does succeed, determining whether the user is a device owner, and, if the user is a device owner, providing to the user a first file system, the first file system being a native file system of the storage device, and, if the user is not a device owner, providing to the user a second file system, the second file system being restricted to files that the user is authorized to access. The first file system may include an algorithm and a supporting data structure for determining access control rights. The second file system may be of a type that does not include an algorithm or a supporting data structure for determining access control rights.

For an authenticated user who is not a device owner, the restricting of the contents of the second file system may be performed before beginning the process of authenticating the user. The restricting of the contents of the second file system may be performed after determining that the user is not a device owner.

The determining of whether the user is a device owner may include ascertaining ownership of a root directory of the first file system. The determining of whether the user is a device owner may include referencing access control rights stored in a non-volatile memory, with the non-volatile memory being either within or outside of the first file system.

The first file system may be an NTFS, and the second file system may be an NTFS. The first file system may be an ext2 file system, and the second file system may be an ext2 file system. The first file system may be an NTFS, and the second file system may appear as a FAT file system.

In accordance with another example embodiment, a storage device has a first memory module, a second memory module, an authentication module, and a controller. The first memory module is operative to store a first file system, the first file system being a native file system of the storage device. The second memory module is operative to store generated file system structures. The authentication module is operative to determine an identity of a user. The controller is operative to activate the authentication module and to provide to the user either the first file system or a second file system, depending on the identity of the user as determined by the authentication module. The providing of the second file system includes generating data based on file system structures of the first file system, according to the identity of the user and access control rights of the user. The generated data is stored in the second memory module.

In this embodiment, the first file system of the storage device may include an algorithm and a supporting for determining access control rights. The second file system may be of a type that does not include an algorithm or a supporting data structure for determining access control rights.

The first file system may reside in NAND flash, NOR flash, or another type of memory. The second memory module may reside in volatile memory, NAND flash, NOR flash, or another type of memory. The authentication module may be constituted by hardware, software, firmware or any combination thereof, in any manner known to those of skill in the art. The controller may be operative to provide the second file system in the same format as that of the first file system.

The first file system of the storage device may be an NTFS, and the second file system may be an NTFS. The first file system may be an ext2 file system, and the second file system may be an ext2 file system. The first file system may be an NTFS, and the second file system may appear as a FAT file system.

In accordance with yet another example embodiment, a controller for a storage device includes a first interface, a second interface, and logic. The first interface is for communication with a host. The second interface is for communication with a first memory module, an authentication module, and a second memory module, the first memory module being operative to store a first file system, which is a native file system of the storage device, the authentication module being operative to determine the identity of a user, and the second memory module being operative to store data. The logic is operative to activate the authentication module and to provide to the user either the first file system or a second file system, depending on the identity of the user as determined by the authentication module. The providing of the second file system includes generating data based on file system structures of the first file system, according to the identity of the user and access control rights of the user. The data is stored in a second memory module.

The first and second interfaces of the controller may be implemented in hardware, software, firmware or any combination thereof, in any manner known to those of skill in the art. The first file system of the controller may include an algorithm and supporting data structure for determining access control rights. The second file system may be of a type that does not include an algorithm or a supporting data structure for determining access control rights.

The logic may be operative to provide the second system in the same format as that of the first file system. The first file system of the controller may be an NTFS, and the second file system may be an NTFS. The first file system may be an ext2 file system, and the second file system may be an ext2 file system. Alternatively, the first file system may be an NTFS, and the second file system may appear as a FAT file system.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements. The accompanying drawings are briefly described below, wherein.

DETAILED DESCRIPTION

The following description is provided in the context of this Application for Letters Patent and its requirements to enable a person of ordinary skill in the art to make and use the claimed invention. Various modifications to and equivalents of the embodiments described and shown are possible and various generic principles defined herein may be applied to these and other embodiments. Thus, the claimed invention is to be accorded the widest scope consistent with the principles, features and teachings disclosed herein.

Described first are example embodiments of methods of providing file systems in storage device systems based on the access rights of the user. Described next is a method processing a host's read request when a second file system is presented. Also described is a storage device is described, which provides file systems based on access rights of a user. Then, a controller is described that may be implemented in the storage device.

In the embodiments described herein, a "file system" may be an implementation of a methodology for storing and organizing computer files. A file system may include a set of abstract data types and metadata that are implemented for the storage, hierarchical organization, manipulation, navigation, access, and retrieval of data. The abstract data types and metadata form a "directory tree" through which the computer files can be accessed, manipulated and launched. A "directory tree" typically includes a root directory and subdirectories. A directory tree is stored in the file system as a "directory file." The set of metadata, directory files, or any subset thereof included in a file system is called herein a "file system structure." Such file system, therefore, includes data files and a file system structure that facilitate accessing, manipulating and launching the data files.

Figure 1A:
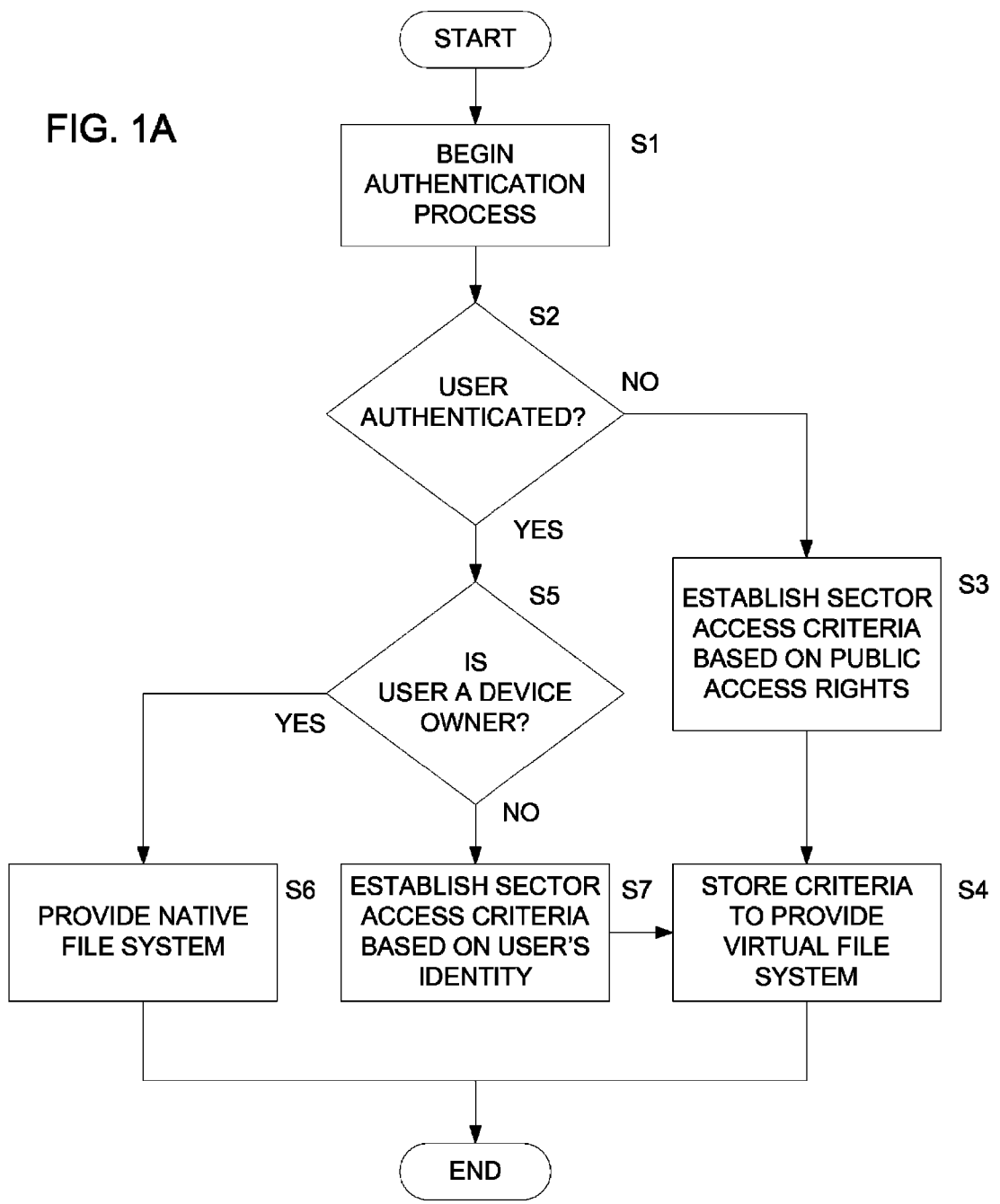
FIG. 1A illustrates a flow chart outlining a method of providing a file system in a storage device in accordance with a first example embodiment.
Figure 1B:
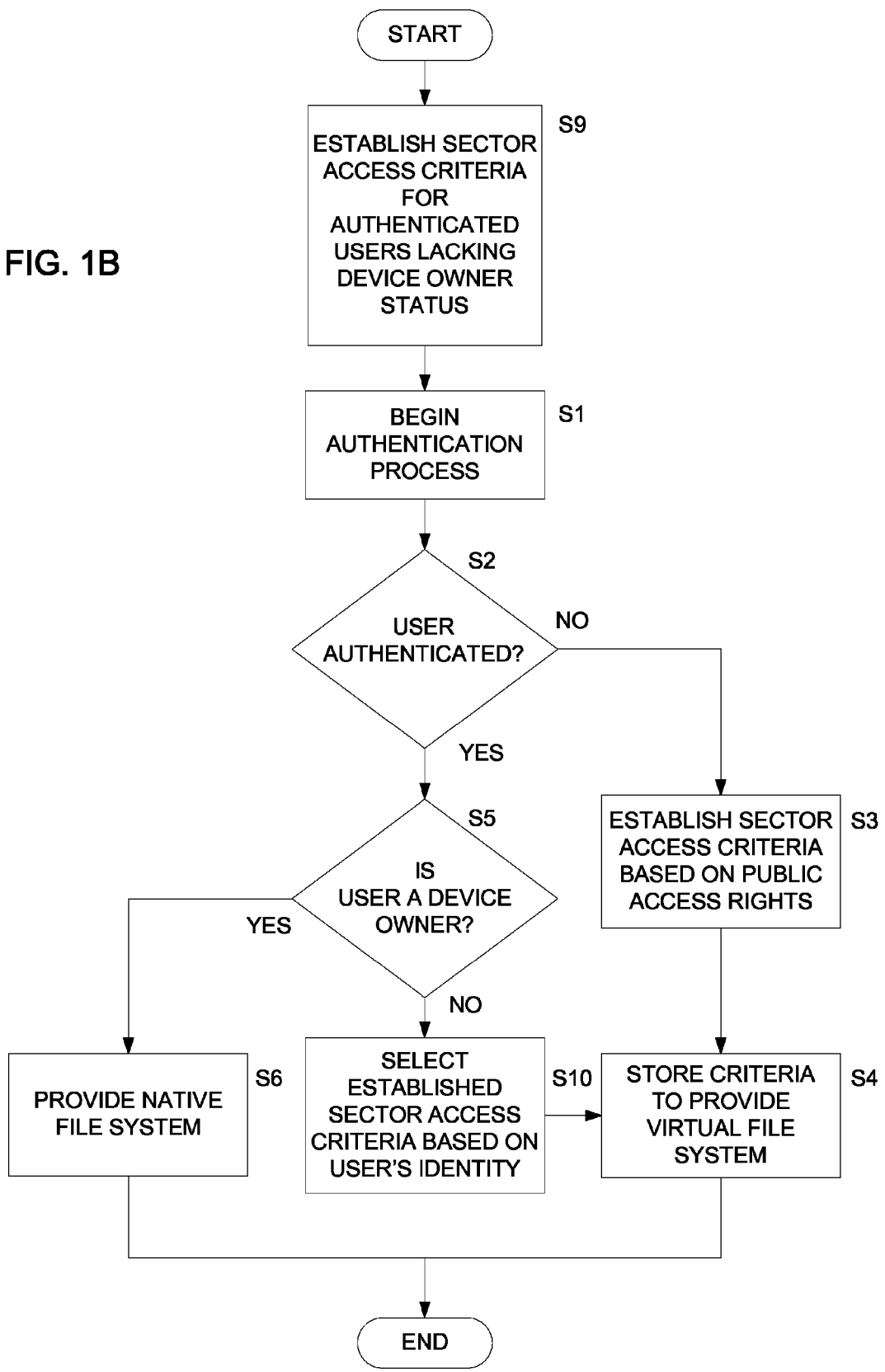
FIG. 1B illustrates a flow chart outlining an alternate method of providing a file system in a storage device in accordance with a second example embodiment.

FIG. 1A illustrates an example embodiment of a method of providing a file system in a storage device. FIG. 1B illustrates an alternate example embodiment of such method. In both embodiments, a file system is provided to a user based on the user's rights.

One example scenario invoking these methods occurs when a user connects to the host a portable storage device, such as a USB flash drive (UFD), a Secure Digital (SD) card, a MultiMedia Card (MMC), a miniSD or a MicroSD. "USB" stands for Universal Serial Bus, which is an external peripheral interface standard for communicating between a computer and external peripherals over cables using bi-serial transmission. "SD" stands for Secure Digital™. MMC, SD, miniSD, and microSD are exemplary flash storage devices that are used with a variety of host devices such as multimedia players (e.g., MP3 and MP4 players), digital cameras, computer laptops, Global Positioning System ("GPS") devices, and so on.

Various storage devices can be adapted to begin such methods automatically upon such connection, and examples of such devices are later described below. Data stored in such a storage device is represented or organized according to a "native file system" (also referred to herein as a "first file system"), which is a representation or organization of the data that is physically stored on the storage device. Under circumstances where the user has rights to only part of the data in the storage device, the data stored in the storage device is also represented or organized in what will be referred to as a "second file system," which term as used in this application refers to a representation or organization of the data based on the limited rights of the user. For example, the second file system may not contain, or may contain but not present to the user, all of the data files contained/presented by the first or native file system, as explained below.

The first step in the method of FIG. 1A and the second step in the method of FIG. 1B are authentication steps. "Authentication" is the process of determining the identity of an individual. For example, a user may be authenticated based on a username and a password. Alternatively, biometric hardware may be implemented to provide authentication. (This process is to be distinguished from the process of "authorization," which is the process of giving an authenticated user access to system objects based on the user's identity.) Some users cannot be authenticated, but the methods of FIGS. 1A and 1B have provisions nonetheless for providing file systems to such users when they attempt to access contents of storage devices. To this end, both methods include the step of beginning a process of authenticating a user. (Step S1.) (The step preceding Step S1 in FIG. 1B will be discussed later.)

After initiating the authentication process of Step S1, a determination is made as to whether the authentication process was successful. (Step S2.) An example situation in which authentication does not succeed is one where a user is not recognized. This can happen if the username, password, or both are not recognized or do not match any expected username/password combination. Another example situation in which authentication does not succeed is simply when the authentication process terminates prematurely, for whatever reason (e.g. software failure on the host).

If the authentication process is not successful, sector access criteria (i.e. identifying which sectors the user will be given access to) are established based on public access rights. (Step S3.) Accordingly, the user may not have access to all files in the native or first file system, i.e. the user may not have access to all files stored on the storage device. Access rights (or limitations thereof) may be determined by algorithms, which reference supporting data structures, for example, access control lists, directory trees, external databases, or any combination of such resources. The native file systems themselves may have the algorithms for determining access control rights. For example, if the first file system of the storage device is in NTFS 3.0 or higher format, the security_ID field within the master file table record (MFT) and corresponding security file ($Secure) entry are used as inputs into the access control algorithm defined within NTFS. According to such algorithm, access may be granted only to sectors allocated to files for which the security_ID field of the corresponding MFT record indicates an Access Control List (ACL) that has an access control entry (ACE) in which the Security ID (SID) is S-1-1-0 (Everyone) or S-1-5-7 (Anonymous user), and the ACE allows access, and for which no other ACE denies access. The storage device stores the sector access criteria (Step S4), for example, in its RAM, for use in providing a second file system in response to a sector read request from a host, as discussed below. The second file system would show as available to the user (who was not successfully authenticated) only the files which users who are defined as "anonymous users" are allowed to access. The methods of FIGS. 1A and 1B may end at this point.

If the authentication of Step S2 is successful, the user is deemed to be an authenticated user, and a determination is made as to whether the user is a device owner. (Step S5.) The device owner may be the owner or primary user of a personal storage device or a member of the Administrators group of a corporate-controlled personal storage device. The present methods accommodate both situations when the device owner is an individual user and situations when the "owner" is any one of a group of users. The device owner status may be determined by ascertaining the ownership of the root directory of a first file system. Alternately, the device owner status may be determined by reading owner information from access control rights stored in a non-volatile memory. The access control rights may be specified as rules outside the file system or as rights inside of or outside of the file system. If the user is a device owner, the first file system is provided to the user (Step S6), and the methods end at this point.

In the method of FIG. 1A, if the authenticated user is not a device owner, sector access criteria are established based on the user's identity determined during the authentication process. (Step S7.) For example, if the native file system of the storage device is in NTFS format, access may be granted to sectors in which the security_id fields of the corresponding MFT records have values that indicate that the particular user has access to those sectors. The sector access criteria may be based on a single rule that applies to an entire class of users or on a set of rules that apply respectively to different sub-groups of users or to different individual users. The process flow then proceeds to Step S4, in which the storage device stores the sector access criteria for use when processing a sector read request. A second file system is now provided to the user, and the method ends at this point. The second file system would show as available to the user (who was successfully authenticated but is not a device owner) only the files which the particular user is allowed to access.

In the method of FIG. 1B, the storage device establishes sector access criteria for a variety of types of users and/or particular users who can be authenticated but are not device owners (Step S9), and this step is executed before beginning the authentication process in Step S1. The sector access criteria may be established when the native file system is created or updated by the device owner. If later an authenticated user is determined in Step S5 not to be a device owner, the sector access criteria for the particular user are selected from the criteria established in Step S9. (Step S10.) The process flow then leads to Step S4, in which the storage device stores the sector access criteria for use when processing a sector read request. A second file system is now provided to the user, and the method can end at this point. The second file system would show as available to the user (who was not successfully authenticated) only the files which the user (the public) is allowed to access.

After a second file system is provided, a host's read request for a sector in the memory of a storage device implementing the present invention may be processed according to the following example procedure described with reference to FIG. 2. The process begins when the storage device receives a sector read request from the host. (Step S1.) In response, the storage device generates a copy of the directory entry that contains the requested sector from the native system. (Step S2.) The copied sector may be stored temporarily in RAM.

From the copied directory entry, the storage device determines whether access to the requested sector is permitted to the particular user according to the established sector access criteria. (Step S3.) For example, if the native file system is in NTFS format, the directory entry is an MFT record, and the storage device checks the established sector access criteria to determine whether the security_id field within the MFT record has a value that permits the user to have access to the sector. If access to the sector is permitted, the storage device returns the sector to the host (Step S4), and the process ends.

If instead the storage device determines in Step S3 that access to the sector is not permitted to the particular user, the storage device modifies data, i.e., the sector in the copy of the directory entry, to prevent the host from retrieving the unmodified sector from the native file system. (Step S5.) For example, in NTFS, the storage device could change attributes by removing standard information or filename attributes or by changing the magic number (a code uniquely identifying the type of record) of the directory entry. With attributes changed accordingly, the file no longer appears in directory listings and cannot be accessed using standard calls to file system application program interface (API), nor does the file appear to be valid when forensic software tools are used to access the storage device. That is, the file is hidden from the user. The process then flows to Step S4, where the storage device returns the modified sector to the host, at which point the process can end.

Various options for cache management are available as known to those skilled in the art. For example, the modified sectors may be stored in the RAM of the storage device to save the resources that would have been required to modify a sector (Step S6) again after the first time a host requests it. This conservation of resources is possible, if no intervening write operation necessitating a re-calculation of the modification occurs between the first and subsequent host requests.

Figure 2:
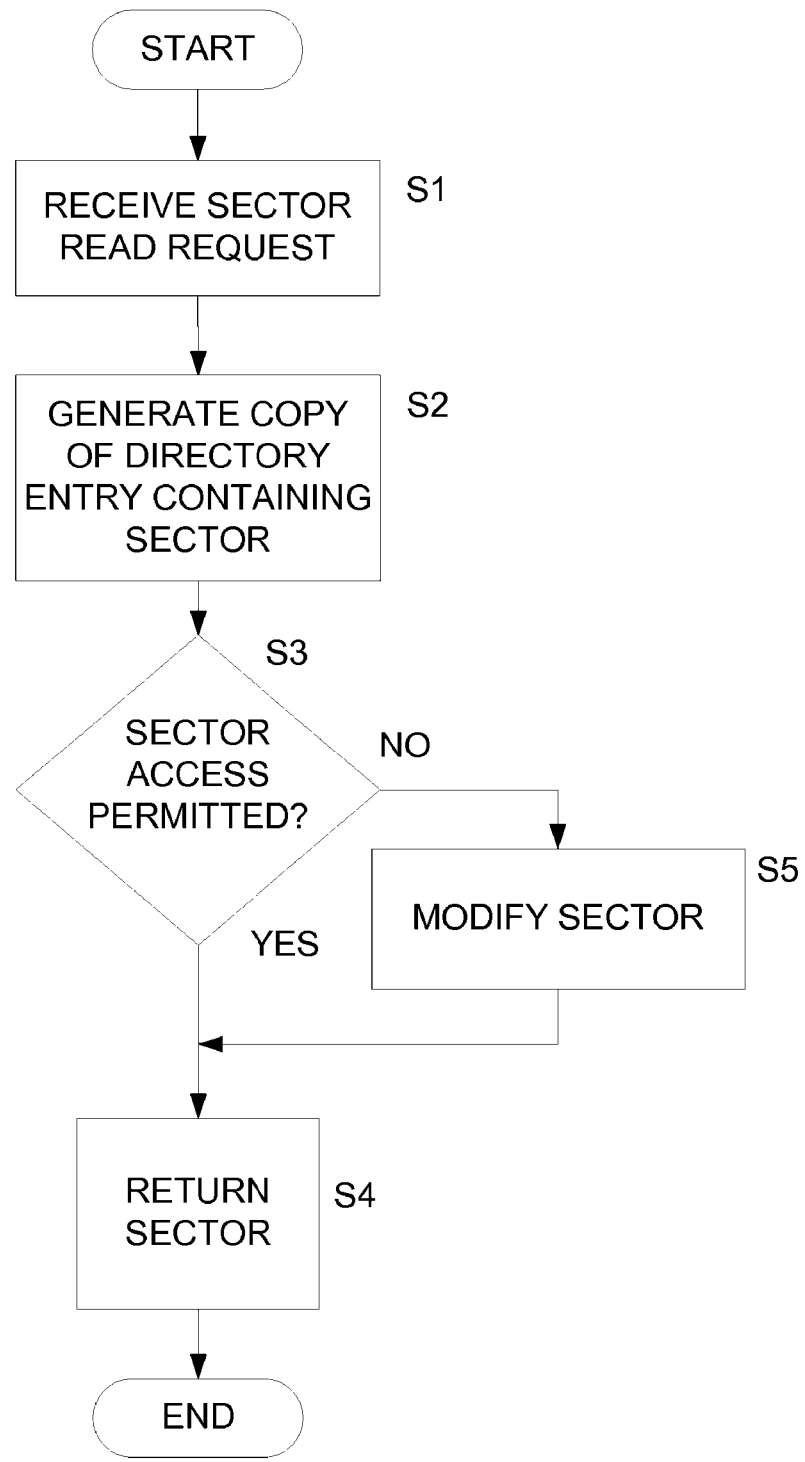
FIG. 2 illustrates a flow chart outlining the process of providing a second file system to a host in response to a host's read request when.

Although the process of FIG. 2 can be applied to a storage device that provides both the first (native) and the second file systems in the same format, for example, in NTFS format (as discussed above), the application of this process is not limited to representing both file systems in the same format or in NTFS format.

For example, the first (native) and second file systems may both be in ext2 format. In this case, the directory entry referenced and/or processed in the various steps is an inode. In Step S3, the determination of whether access to the inode is permitted to a particular user is performed by the storage device checking the owner information within the inode.

Then again, in the case in which the first and second file systems do not have the same format, the first file system can be in NTFS and the second file system can appear as a FAT file system by generating structures such as file allocation tables, a boot parameter block and directories for the second file system. Because FAT file systems do not have algorithms and supporting data structures for determining access control rights, the second file system of this implementation does not include such an algorithm and supporting data structure.

In the case in which the first and second file systems have different formats, all the file system structures for the second file system are generated before the storage device is made accessible for read by the host. However, where the first and second file systems have the same formats, it is not the case that all the file system structures need to be generated before the storage device is made accessible for read by the host; rather, a portion or all of the file system structures may be generated in response to read requests from the host.

Figure 3:
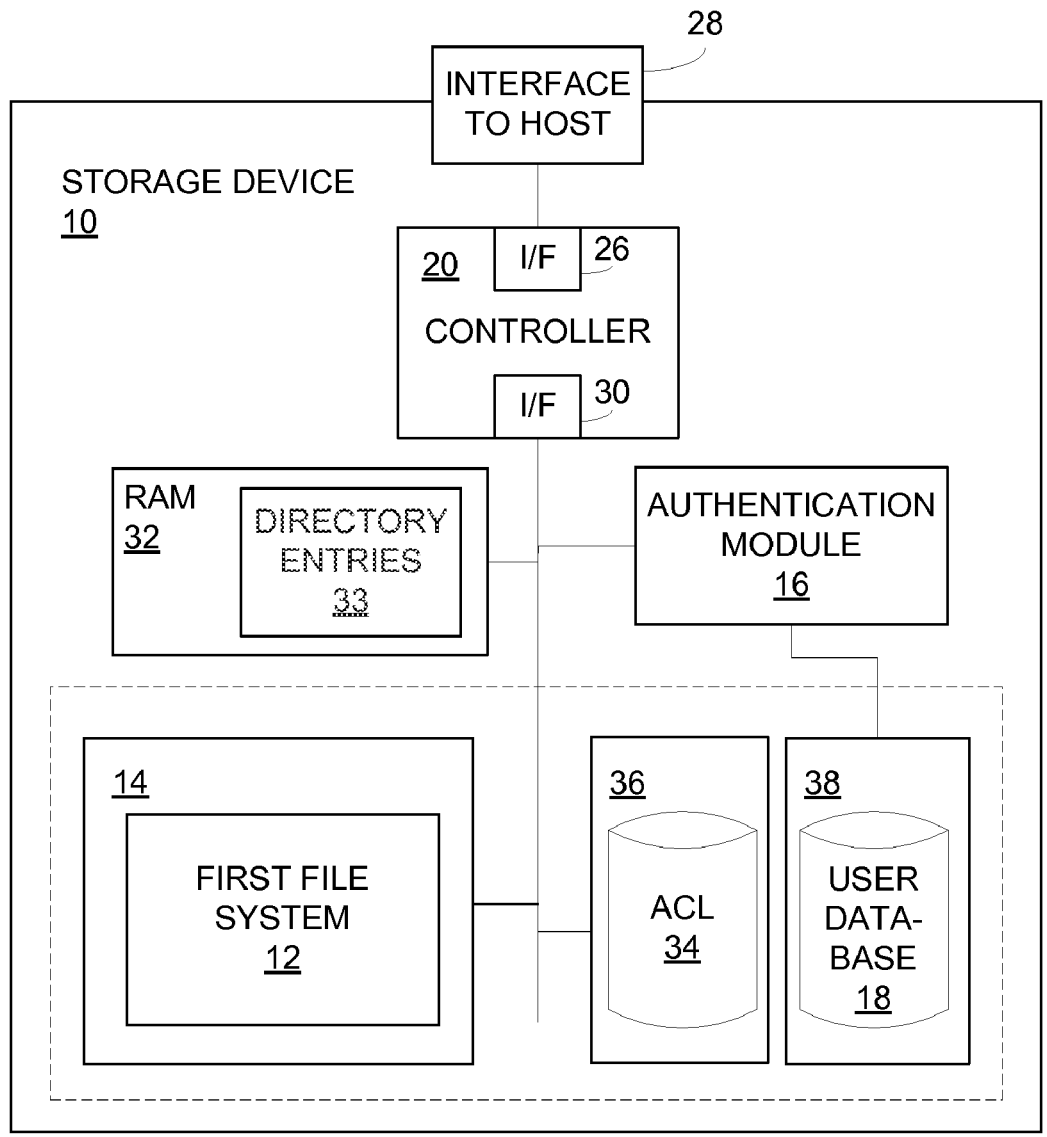
FIG. 3 illustrates a storage device in accordance with another example embodiment.

Another example embodiment of the present invention is a storage device 10 as shown in FIG. 3. The storage device 10 may be implemented, for example, as a UFD, a SD card, a MMC, a miniSD, or a MicroSD. The storage device 10 includes a first file system 12, which is a native file system, stored in a first memory module 14. All files in the first file system 12 are accessible by a device owner, and a subset of those files is accessible also to authenticated users who are not device owners, and in this embodiment a different subset of those files, as determined by public access rights, is accessible to users who are not authenticated. In some alternate embodiments the same set of files may be accessible to both (1) authenticated users who are not device owners and (2) unauthenticated users.

For authenticating users, the storage device 10 includes an authentication module 16, which determines the identity of a user by reference to a user database 18. The authentication module 16 may be embodied as containing hardware, software, firmware, or a combination thereof, which determines authenticity based on identifying information provided by a user.

For example, the authentication module 16 may be embodied to include software code executable by controller 20. The software code compares a username and password received as input through an external interface of the storage device 10 with usernames and corresponding passwords stored in the user database 18. If the software code finds the input username and password in the user database 18, the software code responds with the user's identity. Otherwise, the software code indicates that the user is not authenticated.

Alternatively, the authentication module 16 may be embodied as biometric hardware. For example, the hardware may include a fingerprint scanner or a voice recognition sensor that receives user input in the form of a finger print or audio signal, respectively. The hardware compares the user input to user data in the user database 18 and responds with the user's identity when such information is available.

Figure 4:
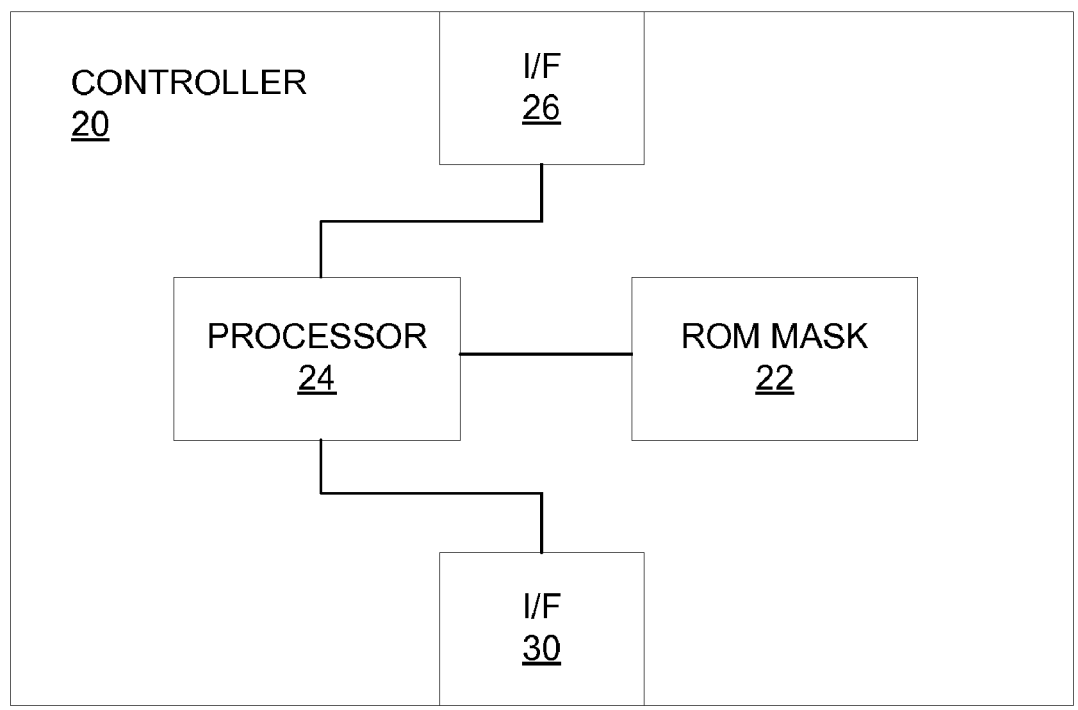
FIG. 4 illustrates a controller that may be implemented in the storage device of FIG. 3.

The storage device 10 has a controller 20, which is operative to activate the authentication module 16 to identify a user and then determine whether to provide to the user either the first file system 12 or a second file system, depending on the user's identity. The controller 20 is operative to perform these tasks, because it has access to program code residing within a ROM mask 22 internal to controller 20, as shown in FIG. 4. The program code residing within the ROM mask 22 may be embodied to direct the controller 20 to operate as described earlier with respect to methods represented by FIGS. 1A, 1B, and 2.

A processor 24 also internal to controller 20 receives host read requests through an interface 26, processes the requests according to the logic within the ROM mask 22, and accesses the other elements of the storage device 10 accordingly though another interface 30 of the controller 20. As shown in FIGS. 3 and 4, the interface 26 of the controller 20 communicates directly with an interface 28 of the storage device 10, which is an interface to the host. Example interfaces available as interface 28 are those that comply with the USB, SD card, MMC, miniSD, or MicroSD standards. Note that, although in this embodiment the logic resides as firmware in a ROM mask 22, the logic may reside elsewhere, such as in a separate ASIC (as hardware). The logic may also be implemented as firmware, for example, as flash-based code running on a general purpose core.

The storage device 10 has a second memory module, a RAM 32, which may be for example a Double Data Rate (DDR) RAM. RAM 32 stores data, i.e., directory entries 33 derived from or based on directory entries of the native file system, which are used for providing second file systems according to the identity and access control rights of the user. Example directory entries may be those described earlier with respect to the methods represented by FIGS. 1A, 1B, and 2. The access control rights may be specified for example by an access control list (ACL) 34 residing in for example a third memory module 36. In alternative embodiments, the first file system 12 may include an algorithm and supporting data structure for determining access control rights.

Also, although in the present embodiment the second memory module 32 is a volatile memory for storing generated file system structures it is not limited to this structure. The second memory module could even be provided instead within a hard drive of the host. The second memory module 32 in the present embodiment is directly addressable by the controller 20. In alternate embodiments, in which the second memory module is not directly addressable by the controller 20, a memory management unit (MMU) or equivalent interface module is used to effect the addressing. Other types of memory that may be used as the second memory module include Synchronous Dynamic Random Access Memory (SDRAM) and DDR Memory.

The present description refers to the memory modules of the first file system 12, the RAM 32, and the access control list 34 as the first, second, and third memory modules. There may also be a further memory module 38 for holding the user database 18. Despite the designation of these four memory modules as separate memory modules in the present discussion, any or all of these memory modules may be implemented together as a single module. For example, the memory modules 14, 36, and 38 may be implemented as elements of a single flash memory unit as indicated by the broken-lined box in FIG. 3.

Having thus described exemplary embodiments, it will be apparent that various alterations, modifications, and improvements will readily occur to those skilled in the art. For example, access control rights may be determined from an owner/group/world specification like that found in Linux file systems, in which a set of access rights is assigned to the owner, another set of access rights is assigned to any user in the same group as the owner, and a third set of rights is assigned to any user ("world") who is not a member of that group or who is not authenticated. A file accessible to all users is considered "world-accessible."

In sum, although various embodiments of the present invention have been described in considerable detail alternations, modifications, and improvements of the disclosed embodiments, though not expressly described above, are nonetheless intended and implied to be within the spirit and scope of the claims. Accordingly, the foregoing discussion is intended to be illustrative only and the invention is limited and defined only by the following claims and equivalents thereto.

What is claimed is:

1. A method of providing a file system, the method comprising:
   in a data storage device operatively coupled to a host device, performing:
      commencing authentication of a user to determine access rights of the user to data stored at the data storage device;
      in response to the user not being authenticated as having access rights other than public access rights to the data stored at the data storage device, providing to the host device a third file system, contents of the third file system being restricted to files authorized by the public access rights; and
      in response to the user being authenticated as having access rights other than public access rights to the data stored at the data storage device, determining whether the user is authenticated as a device owner, wherein:
         in response to the user being authenticated as the device owner, providing to the host device a first file system, the first file system being a native file system of the data storage device, and
         in response to the user not being authenticated as the device owner, providing to the host device a second file system, the second file system being restricted to files that the user is authenticated as being authorized to access.

2. The method of claim 1, wherein the first file system includes instructions executable by a controller of the data storage device for determining access rights.

3. The method of claim 1, wherein, in response to the user not being authenticated as the device owner, the restricting of the contents of the second file system is begun before beginning the process of authenticating the user.

4. The method of claim 1, wherein the restricting of the contents of the second file system is performed after determining that the user is not authenticated as the device owner.

5. The method of claim 1, wherein authenticating whether the user is the device owner includes ascertaining ownership of a root directory of the first file system.

6. The method of claim 1, wherein authenticating whether the user is the device owner includes referencing access control rights stored in a non-volatile memory.

7. The method of claim 1, wherein the second file system is of a type that does not include an algorithm or a supporting data structure for determining access control rights.

8. The method of claim 1, wherein the first file system is a New Technology File System (NTFS), and the second file system is an NTFS.

9. The method of claim 1, wherein the first file system type is a Second Extended (ext2) file system, and the second file system is an ext2 file system.

10. The method of claim 1, wherein the first file system is a New Technology File System (NTFS), and the second file system appears as a File Allocation Table (FAT) file system.

11. A storage device, comprising:
    a first memory module operative to store a first file system, the first file system being a native file system of the storage device and being of a first file system type;
    a second memory module operative to store generated data;
    an authentication module operative to authenticate a user; and
    a controller operative to activate the authentication module and, in response to the user being authenticated as a device owner, to provide access to the first file system, and in response to the user not being authenticated as the device owner, to generate a second file system of the first file system type, wherein, depending on the authentication of the user as determined by the authentication module, a subset of files included in the first file system are included in the second file system and the second file system is stored in the second memory module.

12. The storage device of claim 11, wherein the first file system includes instructions for determining access control rights.

13. The storage device of claim 11, wherein the second file system does not include instructions for determining access control rights.

14. The storage device of claim 11, wherein the second memory module contains volatile memory.

15. The storage device of claim 11, wherein the first file system type is a New Technology File System (NTFS), and the second file system is an NTFS.

16. The storage device of claim 11, wherein the first file system is a Second Extended (ext2) file system, and the second file system is an ext2 file system.

17. A data storage device comprising:
    a first memory module;
    a second memory module;
    an authentication module; and
    a controller, wherein the controller includes:
       a first interface operative to communicate with a host device while the data storage device is operatively coupled to the host device;
       a second interface configured to communicate with the first memory module, the authentication module, and the second memory module, the first memory module being operative to store a first file system, the first file system being a native file system of the data storage device and having a first file system type, the authentication module being operative to determine the identity of a user, and the second memory module being operative to store generated data; and logic operative to activate the authentication module and, in response to the user being authenticated as a device owner, to provide to the user access to the first file system, and in response to the user not being authenticated as the device owner, to generate a second file system having the first file system type and including a subset of files included in the first file system according to access rights of the user and to provide to the user access to the second file system.

18. The data storage device of claim 17, wherein the first file system includes instructions executable by the controller for determining access control rights.

19. The data storage device of claim 17, wherein the second file system does not include instructions executable by the controller for determining access control rights.

20. The data storage device of claim 17, wherein the first file system type is a New Technology File System (NTFS).

21. The data storage device of claim 17, wherein the first file system type is a Second Extended (ext2) file system.

\* \* \* \* \*